United States Patent                                        [11] 3,559,678

| [72] | Inventor | Verne P. Donner |
| | | Palatine, Ill. |
| [21] | Appl. No. | 792,638 |
| [22] | Filed | Jan. 21, 1969 |
| [45] | Patented | Feb. 2, 1971 |
| [73] | Assignee | Deltrol Corporation |
| | | Bellwood, Ill. |
| | | a corporation of Illinois |

[54] CHECK VALVE
1 Claim, 4 Drawing Figs.

[52] U.S. Cl. .................................................. 137/535,
137/539.5, 137/543.23
[51] Int. Cl. ............................................... F16k 15/04
[50] Field of Search .......................................... 137/535,
538, 539, 539.5, 540, 543.21, 543.23

[56] References Cited
UNITED STATES PATENTS
1,398,967  12/1921  Humason et al. ............. 137/543.21X

| 1,931,938 | 10/1933 | Pippin .......................... | 137/539.5 |
| 2,481,713 | 9/1949 | Bertea .......................... | 137/539.5X |
| 2,673,062 | 3/1954 | Cornelius ..................... | 137/540 |
| 3,457,949 | 7/1969 | Coulter ......................... | 137/543.21 |

FOREIGN PATENTS

| 516,777 | 2/1955 | Italy ............................. | 137/543.21 |

Primary Examiner—William F. O'Dea
Assistant Examiner—David J. Zobkiw
Attorney—Ira Milton Jones ABSTRACT: A check valve having an elongated body accurately guided for lengthwise back and forth motion in a valve chamber by substantially thin longitudinal vanes joined to one another at a narrow zone along the axis of the body. The body can have a coaxial hemispherical seat engaging protuberance integrally joined to the forward edges of the vanes, or alternatively, the forward edges of the vanes can be formed with a hemispherical concavity to receive a seat engaging sphere.

PATENTED FEB 2 1971

3,559,678

Verne P. Donner

CHECK VALVE

This invention relates to check valves and has as its purpose to provide an improved check valve featuring a poppet that will seat very accurately and thus assure a long and leakproof life for the valve Another purpose of the invention is to provide a check poppet which can be molded at low cost but with great precision of a plastic material having exceptional antifriction and wearing qualities.

With these observations and objects in mind, the manner in which the invention achieves its purpose will be appreciated from the following description and the accompanying drawings. This disclosure is intended merely to exemplify the invention. The invention is not limited to the particular structure or method disclosed, and changes can be made therein which lie within the scope of the appended claims without departing from the invention.

The drawings illustrate two complete examples of the physical embodiment of the invention constructed according to the best modes so far devised for the practical application of the principles thereof, and in which.

Figure 1:
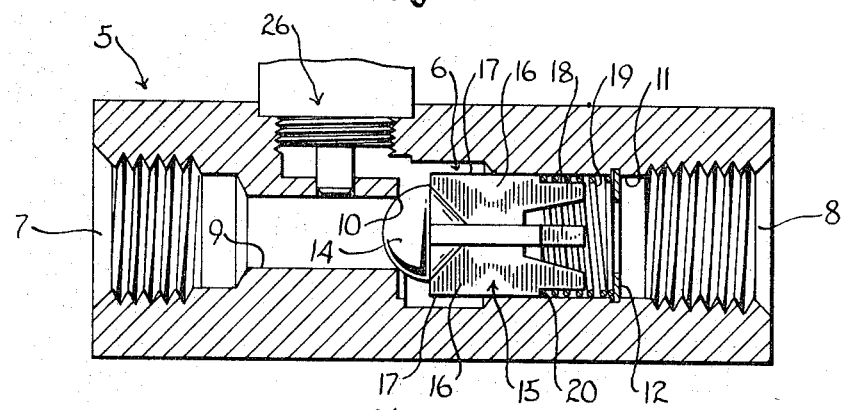
FIG. 1 is a longitudinal sectional view through a check valve device embodying the poppet of this invention.
Figure 2:
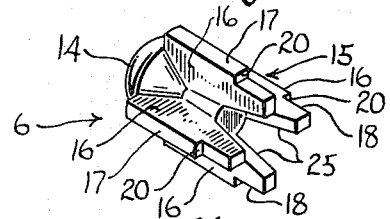
FIG. 2 is a perspective view of the poppet per se.

Referring now more particularly to the drawings, the numeral 5 generally designates an elongated housing for a check valve device of more or less conventional design but embodying a check poppet 6 of this invention. The body has been shown with an axial flow passage that is comprised of threaded coaxial inlet and outlet ports 7 and 8 at the front and rear ends of the body, respectively, a medial bore 9 opening forwardly to the inlet 7 and rearwardly through an annular valve seat 10 to a counterbore 11 that leads to the outlet 8. If desired, the valve seat 10 can be provided by the rear edge of the bore 9, as shown.

The counterbore 11 provides a valve chamber that is slightly smaller in diameter than the outlet port 8, and the check poppet 6 is slidable thereinto through the outlet port and retained against rearward displacement from the counterbore by a snap ring 12 sprung into a groove in its wall rearwardly of the check poppet.

The check poppet 6 comprises a poppet member 14, an elongated body 15 providing a guide member, and means connecting the poppet member with the guide member to prevent its displacement therefrom. The body 15 comprises a number of substantially thin vanes 16 which extend longitudinally of the body and which are joined together along a substantially narrow zone containing the body axis. These vanes radiate outwardly from the axis and have opposite flat sides and outer edges with surfaces 17 that are equidistant from the body axis and are preferably curved concentrically thereto. The outer edge surfaces 17 of the vanes are closely slidingly engaged with the wall of the counterbore 11 to accurately guide the axial sliding motion of the body 15 and to thereby substantially preclude endwise tilting of the body in the counterbore.

While the body can be provided with three radial and substantially angularly equispaced vanes 16, it has been shown as having a cruciform cross section that provides four such vanes. In either event, however, a rear portion of each of the vanes is reduced as at 18 to accommodate a number of encircling convolutions of a coiled expansion spring 19 and to define a spring abutment or stop 20 which faces rearwardly to have the spring bear thereagainst. The other end of the spring bears against the snap ring 12, so that the spring thus serves to yieldingly hold the poppet member 14 on its seat 10.

The poppet member and the guide member can be most advantageously produced as a precision molding, in one integral unit, preferably from a tough and long wearing plastic material having excellent antifriction qualities. One such plastic material is known by the trade name "DELRIN."

When so molded, the poppet member joins the vanes at the forward end of the body, and it is in the nature of a hemispherical protuberance coaxial with the body. Its spherical surface faces and engages the seat 10, and the vanes on the body compel such engagement to be effected with great accuracy each time the check poppet closes, to thus assure a long and useful life for the poppet.

This is in contrast to many other check valve devices of this nature, where the poppet could be forcefully brought into engagement with its seat while in an eccentric attitude relative thereto. In such cases, the seat soon became deformed out of round, especially if the poppet member were a steel ball, with the result that considerable undesirable leakage could then occur.

Figure 3:
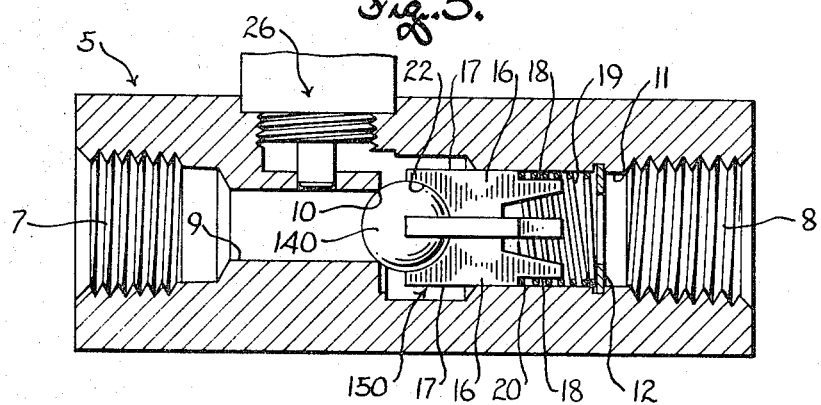
FIG. 3 is a view similar to FIG. 1 but illustrating a modified embodiment of the invention.
Figure 4:
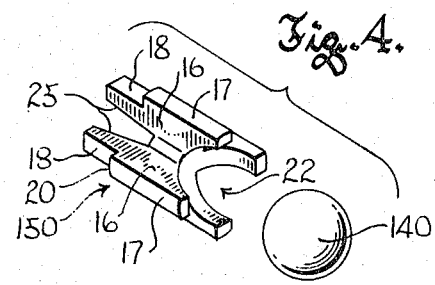
FIG. 4 is a perspective view of the poppet body employed in the FIG. 3 check valve device.

This invention, moreover, assures accurate engagement of the poppet member with its seat 10 regardless of whether the poppet member is formed integrally with the body as described, or whether it is a separate entity such as a ball of steel or plastic. FIGS. 3 and 4 show how this is possible.

As therein seen, the poppet member 140 is a sphere having the same radius as the hemispherical poppet member 14 discussed earlier, and it is substantially deeply nested in what can be termed a hemispherical socket 22 in the forward end of the body 150 otherwise identical to the body 15 in the first described embodiment of the invention. Since the body 150 can also be a precision molding of plastic material, it will be seen that the ball 140 can be nested in its socket 22 with great accuracy and held by the body vanes in perfect coaxiality with its seat 10.

While the snap ring 12 is so disposed as to limit rearward motion of the check valve body 150 to an opening stroke such that the ball 140 could never drop out of its socket 22, extensive tests have shown that the ball always remains snugly nested in the socket during opening and closing motion of the valve. This is not difficult to comprehend when it is visualized that the valve is caused to open because of the force which fluid in the bore 9 exerts upon the front of the ball; and that fluid flow all around the ball when the same is off of its seat holds it secure in its socket. During closure, of course, the inertia of the ball holds it in its socket while the spring propels the valve body forwardly.

In both forms of the invention, rear inner portions of the vanes are notches out as at 25 to provide what amounts to an unobstructed flow path along the axis of the body, to facilitate and smooth out the flow of fluid rearwardly past the vanes when the valve is open.

While forming no part of this invention, the check valve device herein illustrated by way of example is provided with a bypass mechanism 26, shown closed, which can be opened to allow different selected amounts of fluid to be bypassed from the inlet to the outlet.

From the foregoing description, together with the accompanying drawing, it will be readily apparent to those skilled in the art that this invention provides a check valve device featuring a check poppet of a construction which is not only unique but which is highly advantageous from the standpoint of low cost without sacrifice of long and leakproof service.

I claim:

1. A check valve device, characterized by:
    A. a valve body having fore and aft ends and having:
        1. a bore which opens to the forward end of the body;
        2. a rearwardly opening counterbore coaxial with the bore, and to which the bore opens rearwardly; and
        3. an annular rearwardly facing valve seat defined by the junction of the bore with the counterbore and coaxial with the latter;
    B. an annular stop ring fixed in the counterbore a distance rearwardly from the valve seat and cooperating with the seat and the wall of the counterbore to define a valve chamber;
    C. a valve member movable axially in said chamber and comprising a solid, one-piece poppet with an elongated body, and having:
        1. a hemispherically surfaced protuberance on its front to engage said seat;

2. a number of thin angularly equispaced vanes that radiate from a common central junction and extend to the rear of the body from said protuberance, said vanes having elongated antifriction outer edge surfaces to slidingly engage the surrounding wall of the valve chamber and guide the axial movement of the poppet, and having rear end surfaces to engage said stop ring and define the fully open position of the poppet;
3. rear portions of the vanes being relieved to accommodate the encircling convolutions of a poppet spring and to provide a spring seat that opposes said stop ring; and
4. said vanes being relieved at said common central junction forwardly to a point ahead of said spring seat to assure smooth flow of fluid past the poppet in the open position thereof.

D. and a helical poppet spring encircling the relieved rear portions of the vanes and confined axially between said spring seat and the stop ring, to yieldingly urge the poppet toward a seated position.